United States Patent [19]

Perretta

[11] 4,080,826
[45] Mar. 28, 1978

[54] APPARENT WIND INDICATION DEVICE

[76] Inventor: Michael L. Perretta, 4896 Fayetteville Manlius Rd., Manlius, N.Y. 13104

[21] Appl. No.: 774,525

[22] Filed: Mar. 4, 1977

[51] Int. Cl.² .............................................. G01W 1/00
[52] U.S. Cl. ................................ 73/188; 116/114 R; 114/144 C
[58] Field of Search ...................... 114/114 C; 73/188; 116/173, 114 R

[56] References Cited

U.S. PATENT DOCUMENTS

| 3,371,529 | 3/1968 | Tillman | 73/188 |
| 3,845,734 | 11/1974 | Demos | 73/188 |

Primary Examiner—George E. A. Halvosa
Assistant Examiner—Jesus D. Sotelo
Attorney, Agent, or Firm—Charles S. Mc Guire

[57] ABSTRACT

A device for mounting on a sailboat to provide a visual indication of the optimum boat-to-wind angle to achieve maximum distance per unit of time to windward. A pivotally mounted wind vane includes a pair of flexible struts extending outwardly at equal angles on each side of the vane centerline and are deflected from a normal, unflexed position inwardly in proportion to apparent wind velocity. A flexible elongated member is affixed at one end to the support upon which the vane is pivotally mounted and is likewise flexed in accordance with apparent wind direction and velocity. Steering the boat to bring the flexible member into predetermined positional relationship to one of the flexible struts provides the desired optimization, for upwind travel, of boat-to-wind angle. The device is also useful in downwind sailing by aligning one of the struts on the windvane with either the transverse or longitudinal axis of the boat, depending on apparent wind velocity.

10 Claims, 8 Drawing Figures

APPARENT WIND INDICATION DEVICE

BACKGROUND OF THE INVENTION

The present invention relates to apparent wind indicators for sailboats and, more particularly, to a wind indicating device which provides an indication of the proper orientation of the boat centerline to achieve optimum distance made good to or away from the windward direction.

In cruising and particularly in racing sailboats it is desirable to steer a course in which the greatest distance per unit of time toward or away from the windward direction is achieved. This will involve sailing either upwind or downwind, and in either case the centerline of the boat should be oriented at a particular angle with respect to the wind direction. This angle is generally dependent upon the upwind performance of the particular boat and the true wind velocity. Although it is recognized that there may be slight variation between boat centerline orientation and the actual course or line or progress, these terms are used interchangeable herein.

Optimum angles of boat centerline to apparent wind direction may be determined for typical boats at various wind velocities by known vector diagram constructions and mathematical calculations. Without going into further detail, it may be shown that in low wind velocities (e.g., 0–5 knots) the best sailing angle is on the order of 30°; in moderate wind velocities (e.g., 6–10 knots), the angle should be about 20°. In wind velocities greater than about 10 knots, the angle is again on the order of 30°.

Although the prior art includes devices for indicating apparent wind direction which are intended to aid in maintaining a desired course, such devices do not take into account the fact that optimum boat-to-wind angle varies with wind velocity. Other such devices, for example, that disclosed in U.S. Pat. No. 3,845,734, are designed to provide adjustment of sail trim, rather than boat direction, in accordance with apparent wind direction.

It is a principal object of the present invention to provide a visual indicating device for mounting on a sailboat to show the optimum alignment of the boat centerline at various wind velocities.

A further object is to provide a novel combined indicator of apparent wind direction and velocity which aids in establishing an optimum sailboat centerline orientation.

Another object is to provide a novel and improved device which visually indicates optimum boat-to-wind angles for sailboats of different pointing characteristics.

In a more general sense, the object of the invention is to provide a visual indicating device for use in establishing the course of a sailboat.

Other objects will in part be obvious and will in part appear hereinafter.

SUMMARY OF THE INVENTION

In accordance with the foregoing object, the invention includes a wind vane mounted for free pivotal movement to align with apparent wind direction, and one or more members movable in proportion to wind velocity. In the disclosed and preferred embodiment, both an elongated member mounted separately from the wind vane and a pair of struts supported upon the vane, for rotation therewith, are movable by wind force exerted thereon. However, the invention includes embodiments wherein only one of the member and the struts is flexible. The two flexible struts extend at equal angles on each side of the wind vane centerline and are deflectable inwardly, towards one another, from an unflexed position by the force of the wind on lateral surfaces thereof. A stop member limits the maximum amount of inward deflection of the struts.

A flexible member is affixed at one end to the wind vane support and extends along an axis substantially parallel to the centerline of the boat when unflexed. The force of the wind deflects this member about its fixed end to a position commensurate with apparent wind direction and velocity. An index bar on the free end of the flexible member is aligned with one of the flexible struts by appropriate adjustment of the boat centerline with respect to the apparent wind direction. The index bar includes a plurality of laterally spaced indicia, one of which is chosen for alignment with the strut to provide the optimum boat direction in accordance with the sailing characteristics of the particular boat.

DETAILED DESCRIPTION

Figure 1:
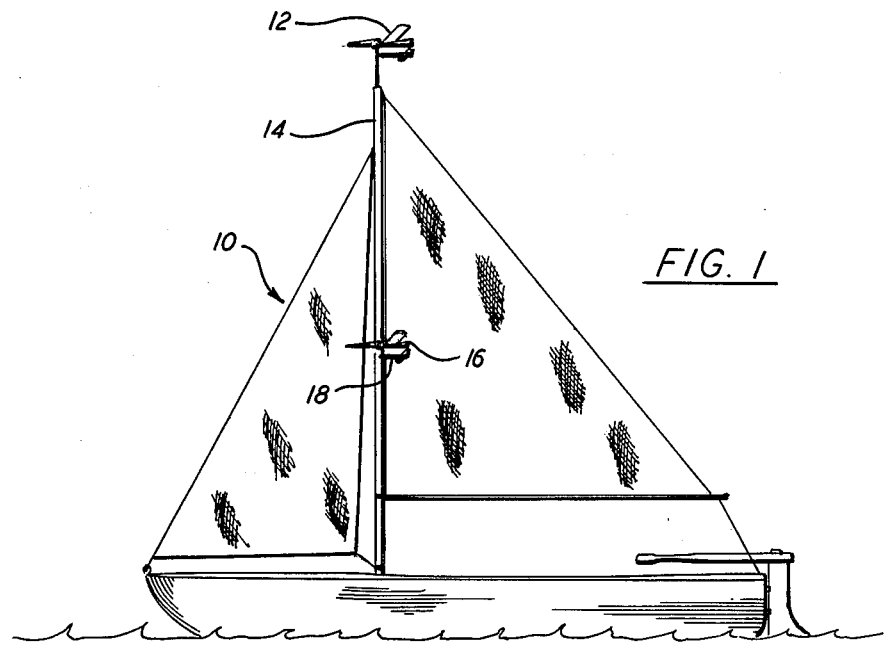
FIG. 1 is an elevational view of a sloop rigged sailboat, showing the device of the invention mounted at alternate positions thereon.

Referring now to the drawings, in FIG. 1 is shown a typical sailboat 10 of the general type with which the invention is most advantageously employed. Actually, the device of the invention may be mounted upon any Marconi or cat rigged sailboat in a position that receives wind undisturbed by the sails or other boat parts. Boat 10 is shown with one of the indicating devices of the invention, generally indicated by reference numeral 12, mounted at the top of mast 14 and another such device 16 mounted on its rigging 18. It will be understood, of course, that an indicating device would normally be employed in one or the other of the indicated positions on a single sailboat, the two devices 12 and 16 being shown in FIG. 1 merely to indicate suitable alternate mounting positions. In applications where the device is mounted on the rigging, both sides of the boat would be so equipped, as pointed out later herein.

Figure 2:
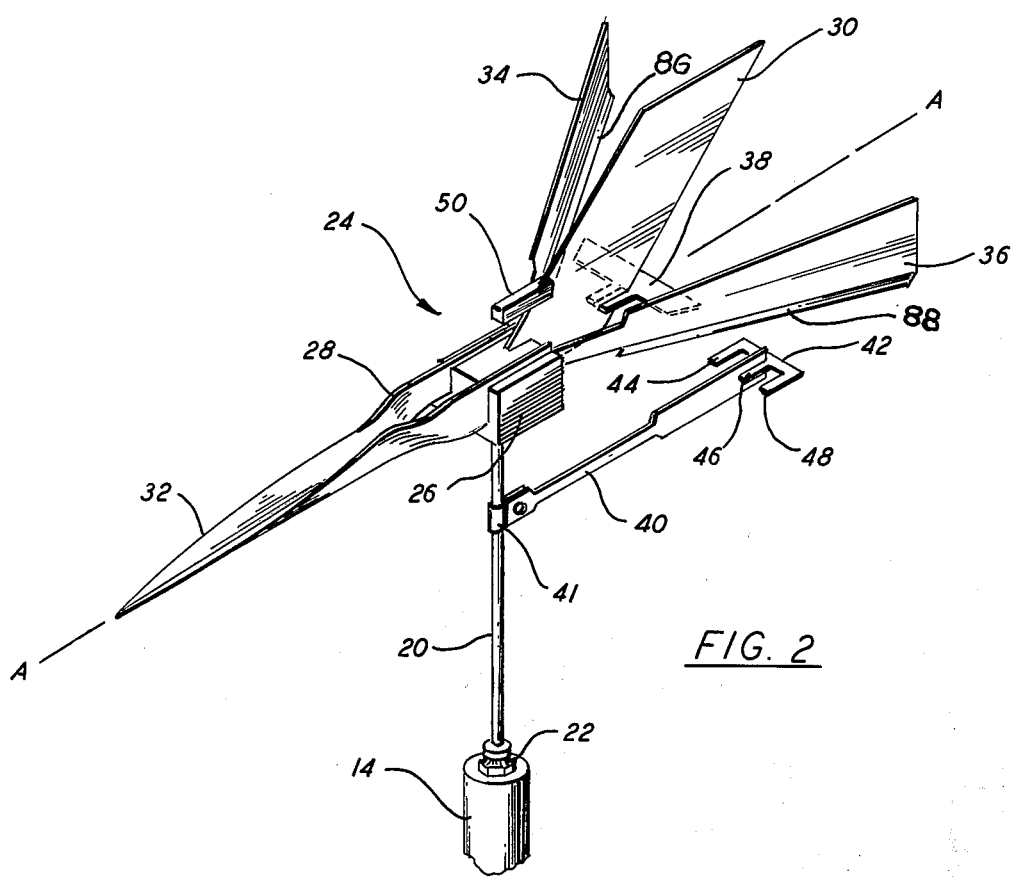
FIG. 2 is a perspective view of a preferred construction of the present invention.

The device may be seen in more detail in FIG. 2, which shows a fragment of the top of mast 14, to which support means such as shaft 20 is fixedly secured and restrained against rotation by means of an appropriate fitting 22. A wind vane, generally denoted by reference numeral 24, is mounted for free pivotal movement atop shaft 20 about the longitudinal axis thereof. Wind vane 24 includes support block 26, which is the pivotally mounted element, to which member 28 and rudder 30 are attached. Although the wind vane may be fabricated in a single piece, the provision of three separate elements, as shown, allows the device to be marketed in kit form and assembled by the user.

Member 28 includes nose portion 32 and is bifurcated to provide laterally extending struts 34 and 36, each of which are inserted in appropriately formed slots in block 26 to extend at equal, predetermined angles with respect to the centerline of wind vane 24, indicated at A—A, through the end of nose portion 32 and the plane of rudder 30.

The material from which member 28, or at least struts 34 an 36 thereof is formed is a resiliently flexible material, such as a suitable plastic. Struts 34 and 36 are thus deflected inwardly from a normal position by a force applied to the vertically disposed, lateral surfaces. In the context of the invention, such forces are provided by wind passing over the surfaces, struts 34 and 36 being deflected inwardly, towards one another and vane centerline A—A by equal amounts in proportion to the apparent wind velocity. i.e., the relative velocity of the air current and the vane. Stop member 38 is affixed to rudder 30 and extends laterally to terminal ends at equal distances on opposite sides of centerline A—A. The maximum extent to which struts 34 and 36 may be deflected inwardly is thus limited by contact thereof with the ends of stop member 38.

Figure 3:
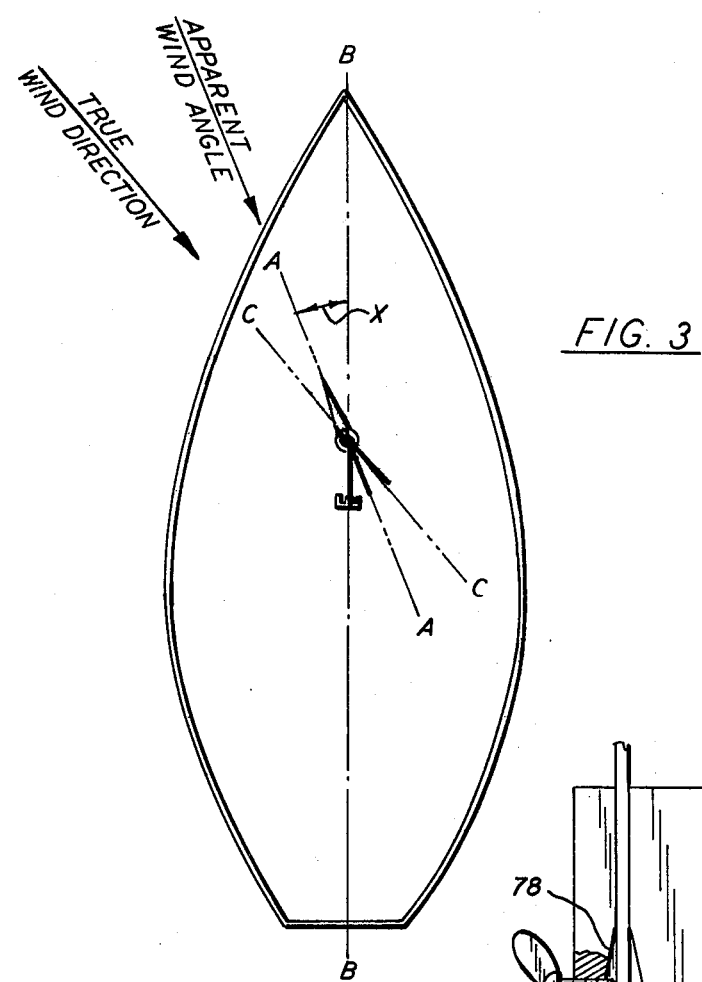
FIG. 3 is a plan view of the outline of the boat hull, illustrating certain angular relationships.

Flexible element 40 is fixedly and non-rotatably secured at one end 41 to shaft 20 in alignment (either coplanar or parallel) with the keel or centerline of boat 10, indicated in FIG. 3 by line B—B. Arm 42 extends laterally across the free end of element 40 and includes index bars 44, 46 and 48, the purpose and use of which will be explained later. The true wind direction in the diagram of FIG. 3 is indicated by line C—C which, for a particular relative velocity of wind and boat, will resolve an apparent wind vector. Since wind vane 24 will align with the apparent wind direction, this vector lies along line A—A. The angle between apparent wind direction and boat course or centerline is indicated in FIG. 3 as angle X. The distance gained per unit of time to windward by sailing along line B—B is a function of angle X for a given wind velocity and direction. Thus, an optimum value of X may be established to provide the maximum windward velocity component of a desired course. As mentioned earlier, the optimum value of X is affected by the velocity as well as the directional component of the wind vector.

Figure 4:
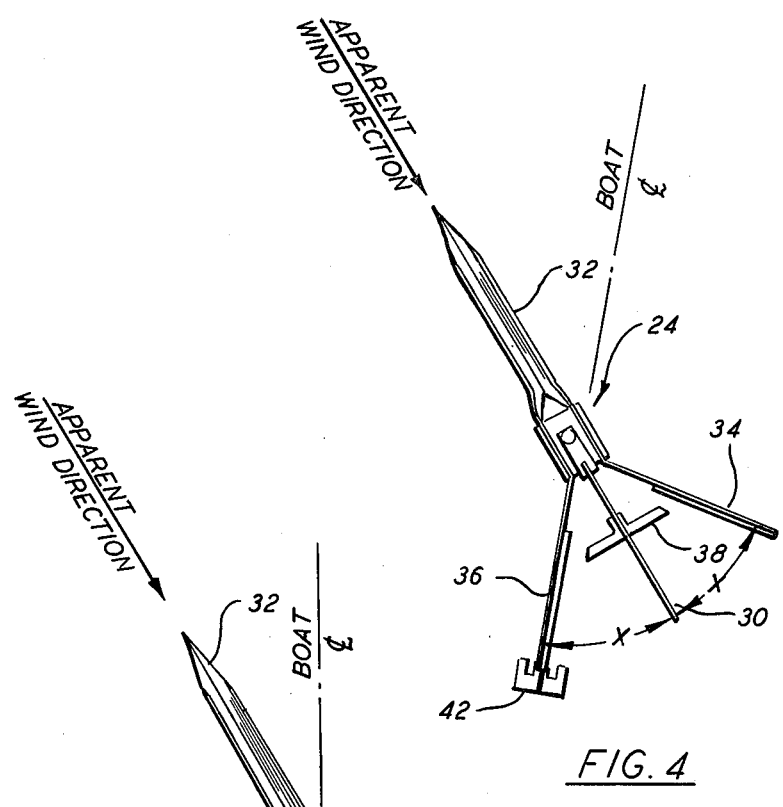
FIGS. 4–6 are a plan view of the device of FIG. 2, shown with various elements shown in positions which they assume at low, moderate and high wind velocities, respectively.
Figure 5:
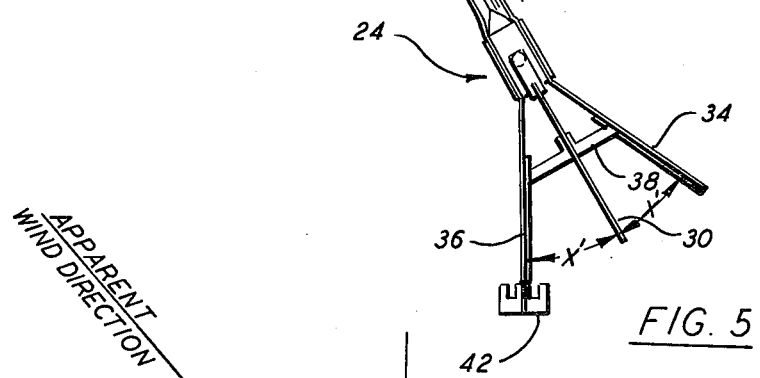
Figure 6:
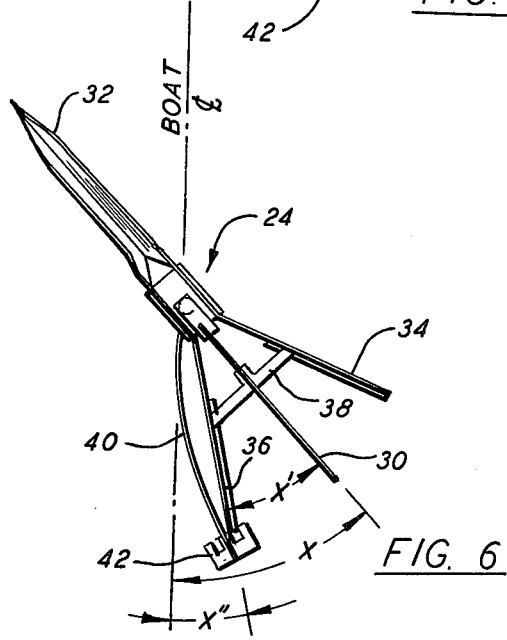

The manner in which the device of the present invention provides a visual indication of optimum X is illustrated in FIGS. 4, 5 and 6. Wind vane 24 will be aligned with the apparent wind direction regardless of velocity. A low velocities, e.g., up to about 5 knots, struts 34 and 36 will be essentially unflexed, extending at equal angles X on each side of vane centerline A—A, as shown in FIG. 4. Likewise, element 40 is unflexed and lies along boat centerline B—B. Angle X is established at substantially 30°, corresponding to the optimum angle between apparent wind and boat direction to achieve maximum distance gained upwind per unit of time in low velocity wind for typical boats. Thus, by observing the device from below and adjusting boat course (rudder) as required to align center index bar 46 with strut 36, the apparent wind-to-boat angle is established at the optimum angle X.

FIG. 5 illustrates operation of the device under moderate wind conditions, e.g., in the range of 6 to 10 knots. In this range, the force exerted by the wind on the sides of struts 34 and 36 will produce some inward deflection. The amount of deflection from the unflexed position of FIG. 4 will, of course, be proportional to apparent wind velocity. The degree of flexibility and lateral exposed area of struts 34 and 36 is such that the struts contact the terminal ends of stop member 38 at about the mid-point of the moderate wind conditions, i.e., at about 8 knots. In this position, shown in FIG. 5, struts 34 and 36 extend at equal angles X' on each side of line A—A. Adjusting boat course to align index bar 46 with strut 36 likewise adjusts the apparent wind-to-boat angle to correspond to angle X', which is established at essentially 20°, the optimum angle for typical boats.

Flexibility and area of member 40 are such that it remains essentially unflexed at moderate, as well as light wind velocities. However, as wind velocity increases further, e.g., in winds above 10 knots, element 40 will be flexed about its constrained end at 41 by the pressure exerted by apparent wind on its exposed lateral surface. This requires an adjustment of boat course in order to bring strut 36 into alignment with element 40 in the position thereof shown in FIG. 6. The angle between a line through the two ends of member 40 and boat centerline B—B is indicated as angle X". Thus, as the course correction is effected, the angle between apparent wind direction and boat centerline is the sum of angle X' and X", thus corresponding to the optimum angle under high wind velocities, which approximates that under low velocities.

As previously mentioned, the optimum value of X depends to some extent on the sailing characteristics, particularly the hull design, of the individual boat. That is, some boats attain greater speed than others at sharper wind-to-boat angles. Thus, if a boat is a good "pointer" the optimum distance gained upwind can normally be achieved by aligning the windward index bar 44 or 48 with the strut on the wind vane. If the boat is of average pointing characteristics, the center index bar is used, whereas the leeward index bar 44 or 48 may be used for cruising type boats which do not point like racers. The index bars are preferably spaced by about 5° with respect to the pivotal axis of the wind vane; thus, alignment of the windward index bar with the strut in its unflexed and fully flexed (against stop member 30) positions will produce wind-to-boat angles of 25° and 15°, respectively, whereas alignment with the leeward index bar will provide angles of 35° and 25°, respectively at the unflexed and fully flexed positions of the strut.

Referring again briefly to FIG. 2, a conventional wind velocity sensor 50 may optionally be mounted on rudder 30, or at other appropriate positions, to provide a more precise indication of apparent wind velocity. Sensor 50 develops an electrical signal commensurate with wind velocity, which is transmitted through appropriate wiring to a readout instrument (not shown) in a convenient location near deck level. This provides what might be termed fine tuning of the device and is another of the uses for outer index bars 44 and 48. That is, the visual indications of the device itself, as explained in connection with FIGS. 4-6, provide a close approximation of optimum wind-to-boat angle for wind velocities at about the mid-points of the ranges indicated. However, if the actual velocity is either higher or lower than the midpoint, as indicated by sensor 50, course may be adjusted to align the approximate outer index bar, with the wind vane strut. For example, as wind velocity increases from, say, 2½ to 8 knots, optimum angle X decreases gradually from 30° to 20° for a typical boat. Thus, if the wind velocity is known to be, say, 6 knots and the optimum value of X is 25° at this velocity (rather than 20° which would result from alignment of the center index bar with the strut) alignment of the leaward index bar produces an increase in X (from the 20° established by alignment of center bar 46), and will result in optimum boat heading.

Figure 7:
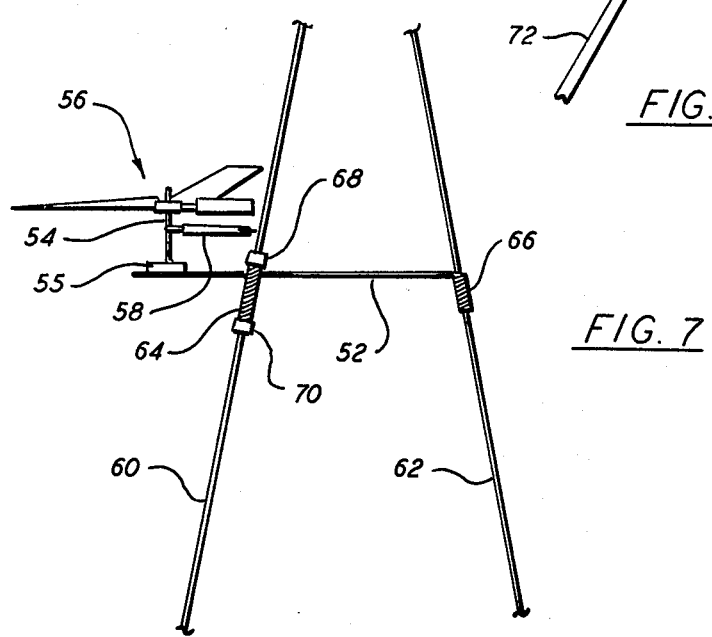
FIG. 7 illustrates a means of mounting the device on the boat's rigging.

When it is inconvenient or otherwise undesirable to attach the device of the invention to the top of the mast, a mounting arrangement such as that illustrated in FIG. 7 may be employed. Since the device is much closer to the individual making the visual observation, it may be smaller in size, e.g., ½ or ⅓ as large as a device mounted at the top of the mast. The mounting means includes support beam 52 to which shaft 54 is fixedly attached by fitting 55. Wind vane 56 and flexible member 58 are rotatably and fixedly secured, respectively, to shaft 54 as in the previously described mounting arrangement. Since it would be difficult to maintain the required parallelism of member 58 and the boat centerline if the mounting means were attached to a single line of the boat's rigging, it is preferred that support beam 52 be attached to at least two shrouds 60 and 62. This may be accomplished in any convenient manner, such as affixing to beam 52 a pair of approximately spaced tubular elements 64 and 66, axially split and suitably flexible to allow snapping over shrouds 60 and 62. Beam 52 is slotted on one side to accept shroud 60. Mounting of the device on the rigging requires, of course, that devices be provided on both the port and starboard sides of the boat with the wind vane so positioned that the rigging or other parts of the boat interfere with neither free rotation nor the air stream to which the device is exposed. Clamps 68 and 70 prevent movement along the shrouds.

Figure 8:
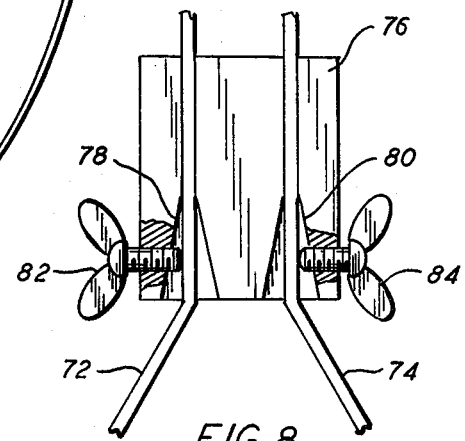
FIG. 8 is an enlarged fragmentary plan view illustrating an alternate means of adjusting the device.

In some applications it may be desirable to provide means for "fine tuning" the indicator device to match the performance characteristics of the particular boat upon which it is mounted. That is, since the optimum boat course-to-wind angle may vary slightly (i.e., a few degrees) from one boat to another, it may be desirable to provide means for varying the value of angle X as represented by the normal or unflexed positions of struts 34 & 36. This may be accomplished by adjusting the unflexed positions of the struts on the wind vane, i.e., the angles between the vane centerline and the struts. A simple mechanism for providing such adjustment is shown in FIG. 8, although many other forms of adjustment means will be readily apparent.

In the illustrated embodiment, struts 72 and 74 extend rearwardly from their fixed supports in the grooves of block 76 at equal angles on each side of the wind vane centerline, in the same manner as struts 34 and 36 of the previously described construction. The grooves are widened at the rear end of block 76, as indicated at 78 and 80. Adjustment screws 82 and 84 extend through threaded openings in block 76 into portions 78 and 80 of the grooves to bear against the fixedly supported portions of struts 72 and 74. Since the struts are formed of flexible material, they will be moved inwardly as screws 82 and 84 are advanced, thereby decreasing the angle between the struts and centerline in the unflexed or "normal" position of the struts. If desired, of course, a single adjustment member may be provided to move both struts simultaneously, thus insuring that the angles of each remain equal with respect to the wind vane centerline.

From the foregoing, it is apparent that the device of the invention improves upon prior art navigational aids of this type by providing a construction which takes into account both apparent wind direction and velocity. While in the embodiments of the invention illustrated and described both the pair of struts on the wind vane and the elongated member 40 are flexible about axes through their fixed ends, it should be recognized that the invention encompasses construction wherein only one of the elongated member and the pair of struts are flexible. For example, struts 34 and 36 could be rigid, and the flexibility of member 40 would still provide a means for taking wind velocity into account. The same would be true if the struts were flexible in proportion to wind velocity while member 40 was rigid. In such constructions, the boat course-to-wind angle would not be optimized as precisely as with the disclosed embodiment, but would be more exact than a course determined only with the aid of a wind vane, or other such prior art devices.

Visual observation of the device and attendant course corrections may be facilitated by making certain portions opaque and others transparent. Referring again to FIG. 2, it will be noted that the major surfaces of struts 34 and 36 are vertically disposed for maximum exposure to apparent wind. Each strut also includes a relatively narrow, horizontally disposed strip along the lower edge. The strips associated with struts 34 and 36 are numbered 86 and 88, respectively. It has been found that visual observation is facilitated by making arm 42, carrying the index bars, and strips 86 and 88 opaque, while making the remainder of struts 34 and 36, rudder 30 and member 40 transparent. Nose portion 32 is also preferably opaque.

In addition to the various constructions previously described, many modifications will be apparent to those skilled in the art. For example, any of the portions 34, 36 and 40 which are movable about axes through their constrained ends in response and proportion to apparent wind velocity may be mounted for rotational rather than flexural movement about such axes. In any case, such portions are resiliently biased toward a "normal" position, when no external forces are applied thereto. Rather than the natural flexibility of the material from which the movable portions are fabricated, the resilient biasing force may be provided by springs, or other well-known biasing means.

Since the biasing force is provided by the natural resiliency of flexibility of the material from which member 40 and/or struts 34 and 36 are formed, in the illustrated constructions, the magnitude of the biasing force is a function of several factors. For example, the type of material, the cross sectional area in regions where the material is flexed, and the area of lateral surfaces exposed to wind pressure all have an effect on the biasing force, and consequently the apparent wind velocity which will produce a given movement. The design factors may be calculated by known techniques, using materials with a suitable modulus of elasticity, but it is also quite simple to construct a device having the necessary biasing force by trial and error.

What is claimed is:

1. An apparent wind indication device comprising:
   (a) a wind vane having a central axis and supported for free rotation about an axis perpendicular to said central axis;
   (b) a pair of struts extending from supported positions on said vane at one end of each to opposite, free ends, said struts extending along lines defining equal, predetermined angles with respect to said central axis, on opposite sides thereof;

(c) an elongated member extending from a supported position at one end to an opposite, free end, said wind vane and said member being relatively arranged so that a line through said ends of said member lies in a common vertical plane with a line through said ends of one of said struts at some point in the rotational movement of said wind vane;

(d) both of said member and said struts being movable about axes through said supported ends thereof perpendicular to the plane of rotation of said central axis; and (e) means providing a predetermined biasing force opposing movement of said member and struts away from predetermined, normal positions thereof, said predetermined biasing force being of such magnitude that wind force exerted on lateral surfaces of said member and struts produces movement about said axes through said supported ends of both said member and struts at high wind velocities, of only said struts at moderate wind velocities and of neither at low wind velocities.

2. The invention according to claim 1 wherein the supported ends of each of said member and struts are constrained against rotation, and are formed of such material and so constructed and arranged as to be flexible about said axes through said supported ends, the natural flexibility of said material providing said biasing force.

3. The invention according to claim 2 wherein the relative magnitudes of said biasing forces on said struts and member are such that said struts are moved away from the normal positions thereof by a force per unit area less than that required to produce a like movement of said member.

4. The invention according to claim 3 wherein said wind vane is supported upon an elongated shaft for free rotation about the longitudinal axis thereof.

5. The invention according to claim 4 wherein said elongated member is attached at said supported end thereof to said shaft.

6. The invention according to claim 3 and further including a stop member arranged between said struts to limit movement thereof from said normal positions toward said central axis to second positions wherein said struts extend at equal, predetermined, second angles on opposite sides of said central axis.

7. The invention according to claim 6 wherein said wind vane includes a rudder arranged in the plane of said central axis and stop member is mounted upon said rudder.

8. The invention according to claim 3 and further including a plurality of index means spaced in a plane parallel to said plane of rotation and mounted upon said free end of at least one of said elongated member and said struts.

9. The invention according to claim 3 and further including wind velocity sensing means mounted upon said wind vane.

10. The invention according to claim 3 and further including means for selectively adjusting, within small acute angles, said predetermined angles.

* * * * *